United States Patent [19]
Koseki et al.

[11] Patent Number: 6,109,941
[45] Date of Patent: Aug. 29, 2000

[54] EJECTOR MECHANISM FOR A MEMORY CARD CONNECTOR

[75] Inventors: Yoshitsugu Koseki, Nagono, Japan; Ming-Chun Lai, Shin-Chuang; Hung-Chih Yu, Hsi-Chi, both of Taiwan

[73] Assignee: Hon Hai Precision Ind. Co., Ltd., Taipei Hsien, Taiwan

[21] Appl. No.: 09/364,270

[22] Filed: Jul. 29, 1999

[30] Foreign Application Priority Data

Mar. 2, 1999 [TW] Taiwan ................................. 88201714

[51] Int. Cl.[7] .................................................. H01R 13/62
[52] U.S. Cl. ............................................................ 439/159
[58] Field of Search ................................. 439/152–157, 439/159, 160

[56] References Cited

U.S. PATENT DOCUMENTS

| | | | |
|---|---|---|---|
| 5,290,174 | 3/1994 | Worathyla et al. | 439/377 |
| 5,324,204 | 6/1994 | Lwee | 439/159 |
| 5,507,658 | 4/1996 | Ho | 439/159 |
| 5,558,527 | 9/1996 | Lin | 439/159 |
| 5,695,351 | 12/1997 | Kimura et al. | 439/159 |

*Primary Examiner*—Gary F. Paumen
*Attorney, Agent, or Firm*—Wei Te Chung

[57] ABSTRACT

An ejector mechanism for a memory card connector includes a plate defining a guiding groove therein, a push bar, a leaf spring, a slider, a spring and a case. The slider provides a guiding pin and an elongate hole on opposite ends thereof. The plate defines a recess and forms a raised portion and a dowel in opposite ends of the recess. The dowel of the plate can move forward and backward within the hole. The end of the slider including the guiding pin approaches the raised portion when the guiding pin is located at a predetermined position of the groove of the plate for preventing the guiding pin from being misguided in the groove.

3 Claims, 4 Drawing Sheets

EJECTOR MECHANISM FOR A MEMORY CARD CONNECTOR

BACKGROUND OF THE INVENTION

The present invention relates to an ejector mechanism for a memory card connector.

U.S. Pat. No. 5,558,527 discloses an ejector mechanism for a memory card connector. The ejector mechanism comprises a plate, a push rod, a slider, a spring and a drive linkage. The plate has guiding means at a predetermined position for ensuring smooth movement of the slider. The movement of the slider causes the drive linkage to release a memory card from the connector. However, while moving along the plate, the slider wavers in a vertical direction. Thus, the slider may be misguided along the plate and the ejector mechanism will not be able to release the connector. Hence, an improved ejector mechanism is required to overcome the disadvantages of the prior art.

BRIEF SUMMARY OF THE INVENTION

An object of the present invention is to provide an ejector mechanism for a memory card connector, which can reliably eject a memory card from a corresponding connector.

Accordingly, an ejector mechanism for a memory card connector includes a plate defining a guiding groove therein, a push bar, a leaf spring, a slider, a spring and a case. The slider provides a guiding pin and an elongate hole on opposite ends thereof, respectively. The push bar defines a recess and forms a raised portion and a dowel in opposite ends of the recess. The dowel of the plate can move forward and backward within the hole. The end of the slider including the guiding pin approaches the raised portion when the guiding pin is located at a predetermined position of the groove of the plate for preventing the guiding pin from being misguided within the groove.

Other objects, advantages and novel features of the invention will become more apparent from the following detailed description of the present embodiment when taken in conjunction with the accompanying drawings.

DETAILED DESCRIPTION OF THE INVENTION

Figure 1:
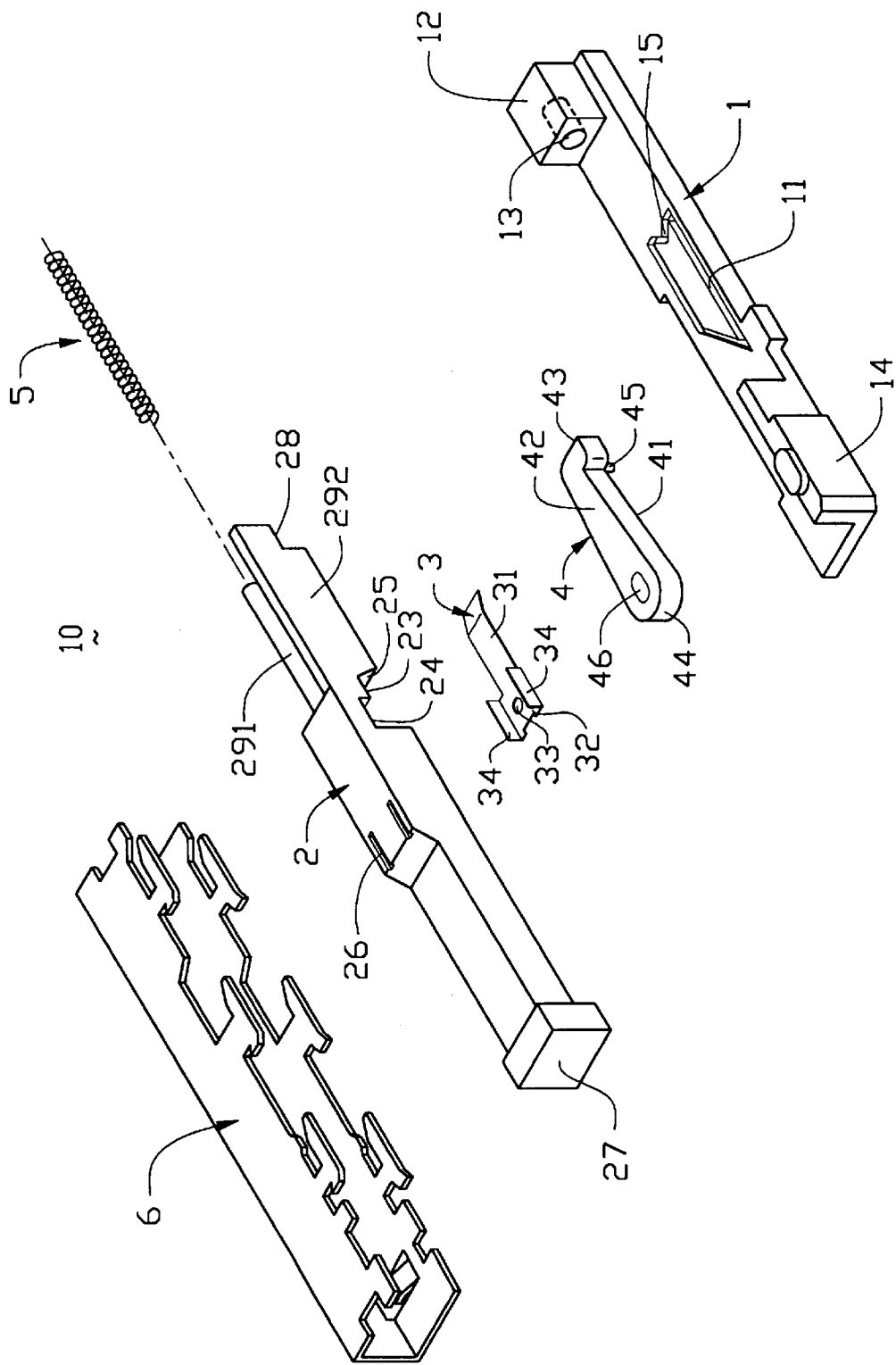
FIG. 1 is an exploded view of an ejector mechanism for memory card connector of the prevent invention.

An ejector mechanism 10 is assembled to a memory card connector for releasing a memory card (not shown) therefrom. Referring to FIG. 1, the ejector mechanism 10 includes a plate 1 defining a guiding groove 11 therein, a push bar 2, a leaf spring 3, a slider 4, a spring 5, and a case 6. The guiding groove 11 forms several stairs (not shown) and a stopping section 15 at predetermined positions thereof. A block 12 is positioned on an end of the plate 1, and an inner hole 13 is formed in the block 12 for retaining an end of the spring 5. A wall 14 is provided on an edge of the plate 1 proximate an end thereof. The wall 14 is distanced from the block 12 for guiding the push bar 2 along the plate 1.

Figure 2:
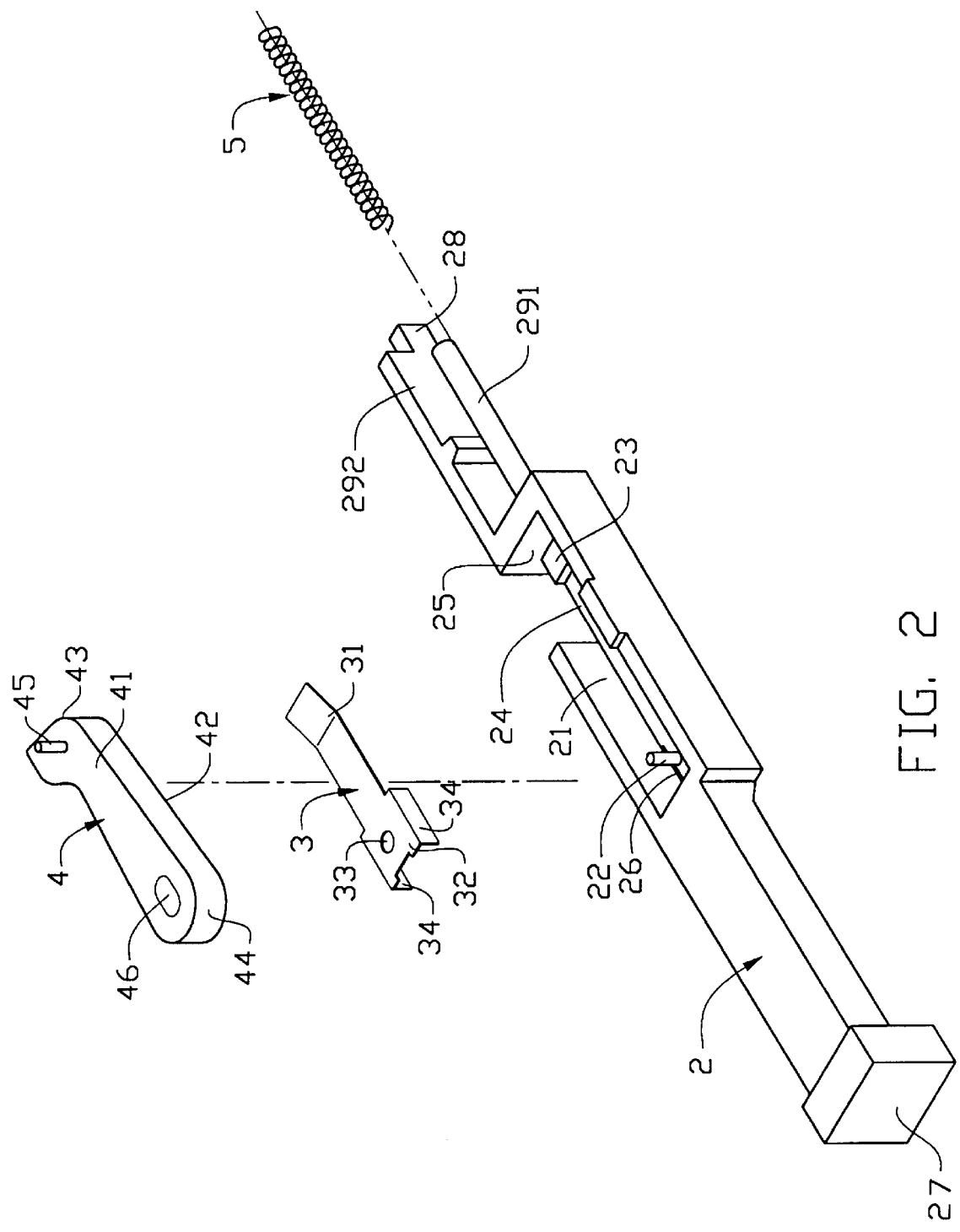
FIG. 2 is a view similar to FIG. 1 but taken from a different perspective with a plate and a case removed.

Also referring to FIG. 2, the push bar 2 defines a recess 21 substantially in a middle portion thereof The recess 21 is at least bound by a bottom face 24 and a front face 25. A dowel 22 and a raised portion 23 upwardly extend from opposite ends of the bottom face 24 of the recess 21. The raised portion 23 also extends from the front face 25 of the recess 21. A pair of gaps 26 are defined through opposite sides of the bottom face 24 of the recess 21 proximate the dowel 22 for retaining the leaf spring 3 therein. The push bar 2 has a first end 27 and an opposite second end 28. A pole 291 extends from the second end 28 of the push bar 2 for retaining the spring 5. A guiding portion 292 is provided beside the pole 291 for smoothly guiding the push bar 2 along the plate 1.

The leaf spring 3 forms a spring arm 31 and a retaining portion 32 on opposite ends thereof. A through hole 33 is formed through a center of the retaining portion 32 and a pair of tabs 34 extend from opposite sides thereof. The slider 4 has a first surface 41, an opposite second surface 42 a front portion 43, and an opposite rear portion 44. A guiding pin 45 extends from the first surface 41 proximate the front portion 43 and an elongate hole 46 is defined through the first and second surfaces 41, 42 proximate the rear portion 44.

In assembly, the leaf spring 3 is positioned in the recess 21 of the push bar 2 wherein the tabs 34 are received in the gaps 26 and the dowel 22 is received in the through hole 33. The slider 4 is positioned on the leaf spring 3 whereby the second surface 42 abuts against the spring arm 31 and the elongate hole 46 receives the dowel 22 of the push bar 2. The plate 1 is assembled to the push bar 2 and the guiding pin 45 of the slider 4 is received in the guiding groove 11. The spring 5 is assembled between the plate 1 and the push bar 2 whereby opposite ends thereof engage with the inner hole 13 and the pole 291, respectively. The push bar 2 together with the leaf spring 3, the slider 4, the spring 5 and the plate 1 is assembled to the case 6.

Figure 3:
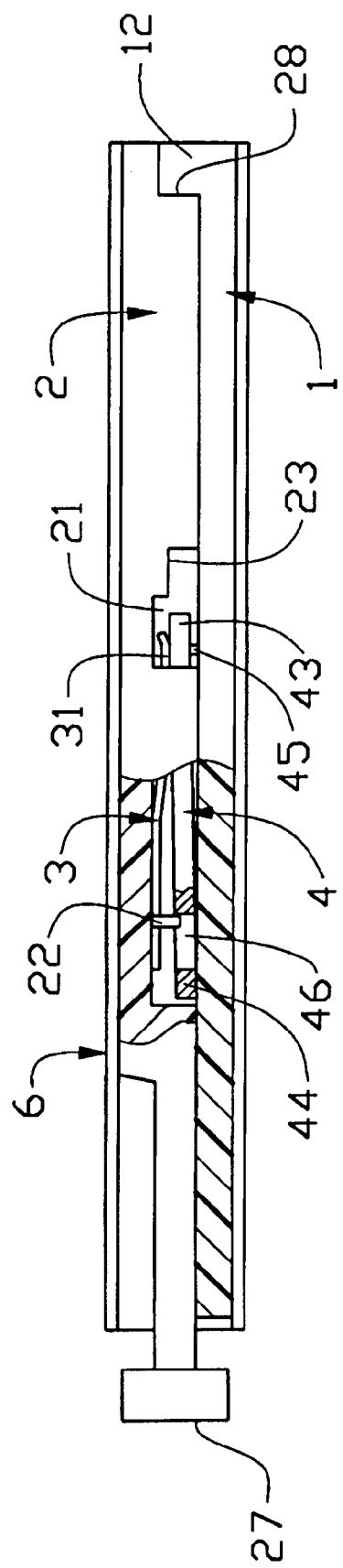
FIG. 3 is a partial, cross sectional view of an ejector mechanism for memory card connector of the present invention wherein a guiding pin of a slider is positioned at a stopping section of a groove of the plate while an extra force is applied to a push bar.
Figure 4:
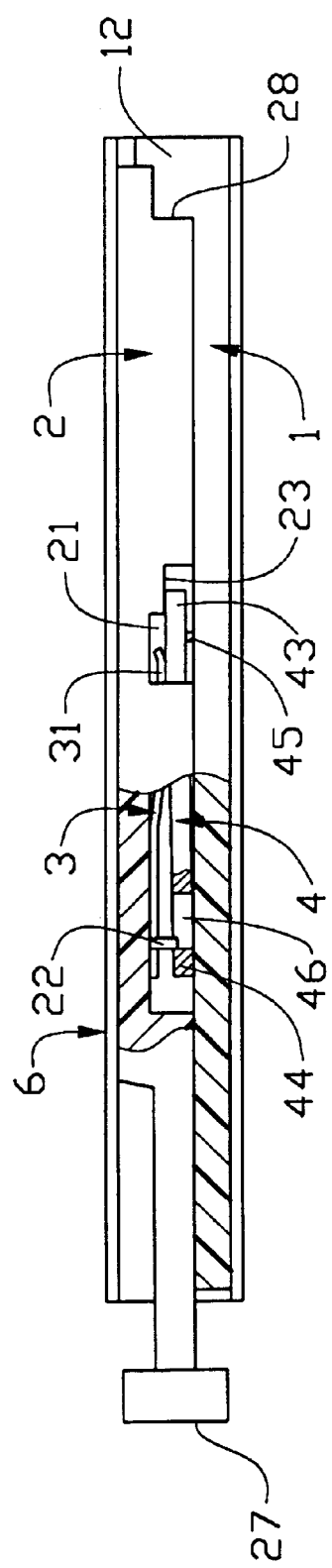
FIG. 4 is a view similar to FIG. 3 but an extra force is not applied to the push bar.

Referring to FIGS. 3 and 4, when the guiding pin 45 of the slider 4 is positioned at the stopping section 15 of the groove 11 of the plate 1, a force exerted on the first end 27 of the push bar 2 causes the push bar 2 to move toward the block 12 of the plate 1. Since the dowel 22 of the push bar 2 can move forward and backward within the elongate hole 46 of the slider 4, the guiding pin 45 moves backward toward the push bar 2 thereby causing the front portion 43 of the slider 4 to move away from the raised portion 23 of the recess 21. When the force is removed, the spring 5 urges the push bar 2 to move away from the block 12 of the plate 1 thereby causing a relative movement between the slider 4 and the push bar 2. The relative movement causes the front portion 43 of the slider 4 to approach the raised portion 23 of the push bar 2 and successively be positioned under and almost pressed by the raised portion 23 before the push bar 2 starts depressing the spring 5 thereby preventing the guiding pin 43 from being misguided along or dropped from the plate 1 due to vibration generated by confrontation of the push bar 2 and the spring 5.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An ejector mechanism for a memory card connector, comprising:

a plate defining a guiding groove on a surface thereof, the guiding groove having a transition section;

a push bar operable to be slidable with respect to the plate and having a recess and a raised portion within the recess, the raised portion being aligned with the transition section of the guiding groove;

a slider having a front portion and an opposite rear portion, and being pivotably mounted to the push bar within the recess, the front portion providing a guiding pin biased to be engaged in the guiding groove of the plate, the slider being movable with respect to the push bar to cause the front portion to enter between the raised portion and the transition section;

a spring assembled between the push bar and the plate; and a case for retaining the plate and the push bar together;

wherein the front portion of the slider, after entering between the raised portion of the push bar and the transition section of the guiding groove, engages the transition section, thereby preventing the slider from an uncontrolled movement;

wherein the push bar has a dowel in the recess, and the slider comprises an opening for receiving the pole, the opening being dimensioned to permit a forward and backward movement of the slider with respect to the push bar;

wherein the opening of the slider is an elongate hole.

2. The ejector mechanism for a memory card connector as claimed in claim 1, wherein the transition section corresponds to a stopping section of the groove of the plate.

3. The ejector mechanism for a memory card connector as claimed in claim 1, wherein a block is provided on an end of the plate, and an inner hole is formed therein for receiving an end of the spring.

* * * * *